United States Patent
Makeiff et al.

(10) Patent No.: US 9,623,345 B2
(45) Date of Patent: Apr. 18, 2017

(54) PHASE SELECTIVE GELATION WITH ALKYLATED AROMATIC ACID COMPOUNDS

(75) Inventors: Darren A. Makeiff, St. Albert (CA); Rina Carlini, Oakville (CA)

(73) Assignees: XEROX CORPORATION, Norwalk, CT (US); NATIONAL RESEARCH COUNCIL OF CANADA, Ottawa (CA)

( * ) Notice: Subject to any disclaimer, the term of this patent is extended or adjusted under 35 U.S.C. 154(b) by 1247 days.

(21) Appl. No.: 13/327,664

(22) Filed: Dec. 15, 2011

(65) Prior Publication Data

US 2013/0153508 A1   Jun. 20, 2013

(51) Int. Cl.
*B01D 17/02* (2006.01)
*B01J 13/00* (2006.01)

(52) U.S. Cl.
CPC ...... *B01D 17/0202* (2013.01); *B01J 13/0065* (2013.01)

(58) Field of Classification Search
CPC ........................................... C02F 1/40
See application file for complete search history.

(56) References Cited

U.S. PATENT DOCUMENTS

| 7,883,574 | B2 | 2/2011 | Carlini et al. | |
|---|---|---|---|---|
| 2007/0060658 | A1* | 3/2007 | Diaz et al. | 516/102 |
| 2010/0037955 | A1 | 2/2010 | Carlini et al. | |

OTHER PUBLICATIONS

Schulz et al. "Preparation and characterization of ordered thin films based on aromatic poly(1,3,4-oxadiazole)s". Reactive & Functional Polymers, 30, 1996, 353-360.*
Carretti et al. "Soft matter and art conservation. Rheoreversible gels and beyond". Soft Matter, 1, 2005, 17-22.*
Potluri et al. ("Isophthalic acid-derived organogelators", J Supramol. Chem. 2, 2002, 321-326).*
Kar et al. ("Organogelation and hydrogelation of low-molecular-weight amphiphilic dipeptides: pH responsiveness in phase-selective gelation and dye removal" Langmuir 2009, 25(15), 8639-8648).*
Schulz et al. ("Preparation and characterization of ordered thin films based on aromatic poly(1,3,4-oxadiazole)s", Reactive & Functional Polymers 30, 1996, 353-360).*
Darren A. Makeiff et al., Copending U.S. Appl. No. 12/820,497, filed Jun. 22, 2010.
Darren A. Makeiff et al., Copending Application (not yet assigned), filed concurrently herewith.
Raghavan, S. and Cipriano, B., "Gel Formation: Phase Diagrams Using Tabletop Rheology and Calorimetry", Chapter 8, pp. 241-252 in Molecular Gels, Weiss, R. and Terech, P., eds., Springer (2006).
Terech, P.; Weiss, R. G. Chem. Rev. 1997, 97, 3133-3159.
Hirst, A. R.; Escuder, B.; Miravet, J. F.; Smith, D. K. Angew. Chem. Int. Ed. 2008,47, 8002-8018.
Lee, H. Y.; Nam, S. R.; Hong, J.-I. J. Am. Chem. Soc. 2007, 129, 1040-1041.
Nam, S. R.; Lee, H. Y.; Hong, J.-In. Tetrahedron 2008, 64, 10531-10537.
Potluri, V. K.; Hamilton, A. D. J. Supramol. Chem. 2002, 2, 321-326.
Zafar, A.; Yang, J.; Geib, S. J.; Hamilton, A. D. Tet. Lett. 1996, 37, 14, 2327-2330.
Rodriguez-Llansola, F.; Escuder, B.; Miravet, J. F.; Hermida-Merino, D.; Hamley, I. W.; Cardin, C. J.; Hayes, W. Chem. Commun. 2010, 7960-7962.
Hu, H.-Y.; Yang, Y.; Xiang, J.-F.; Chen, C.-F. Chin. J. Chem. 2007, 25, 1389-1393.
Bhattacharya, S.; Krishnan-Ghosh, Y. Chem. Commun. 2001, 185-186.
Khatua, D.; Dey, J. Langmuir 2005, 21, 109-114.
Kar, T.; Debnath, S.; Das, D.; Shome, A.; Das, P. K. Langmuir 2009, 25, 8639-8648.
Jadhav, S. R.; Vemula, P. K.; Kumar, R.; Raghavan, S. R.; John, G. Angew. Int. Ed. Engl. 2010, 49, 1-5.
Liu, J.-W.; Ma, J.-T.; Chen, C.-F. Tetrahedron 2011, 67, 85-91.
Xue, M.; Gao, D.; Liu, K.; Peng, J.; Fang, Y. Tetrahedron 2009, 65, 3369-3377.
Trivedi, D. R.; Ballabh, A.; Dastidar, P.; Ganguly, B. Chem. Eur. J. 2004, 10, 5311-5322.
Trivedi, D. R.; Ballabh, A.; Dastidar, P. Chem. Mater. 2003, 15, 3971-3973.
Lebel, O.; Perron, M.-E.; Mans, T.; Zalzal, S. F.; Nanci, A.; Wuest, J. D. Chem. Mater. 2006, 18, 3616-3626.
Darren A. Makeiff et al., Copending U.S. Appl. No. 12/777,329, filed May 11, 2010.
Darren A. Makeiff et al., Copending U.S. Appl. No. 13/293,963, filed Nov. 10, 2011.

* cited by examiner

*Primary Examiner* — Krishnan S Menon
*Assistant Examiner* — Ryan B Huang
(74) *Attorney, Agent, or Firm* — Pillsbury Winthrop Shaw Pittman LLP

(57) ABSTRACT

Disclosed is a process which comprises mixing an alkylated aromatic acid with a mixture comprising a first liquid and a second liquid, thereby causing formation of an organogel comprising the alkylated aromatic acid and the first liquid.

9 Claims, No Drawings

PHASE SELECTIVE GELATION WITH ALKYLATED AROMATIC ACID COMPOUNDS

CROSS-REFERENCE TO RELATED APPLICATIONS

Reference is made to U.S. application Ser. No. 12/820,497, filed Jun. 22, 2010, entitled "Self-Assembled Nanostructures," with the named inventors Darren Makeiff and Rina Carlini, the disclosure of which is totally incorporated herein by reference.

Reference is made to Copending Application, U.S. Ser. No. 13/327,655, filed 15 Dec. 2011, entitled "Organogel Compositions Comprising Alkylated Aromatic Acids," with the named inventors Darren A. Makeiff and Rina Carlini, the disclosure of which is totally incorporated herein by reference.

PARTIES TO A JOINT RESEARCH AGREEMENT

This application is a result of activities undertaken within the scope of a joint research agreement between Xerox Corporation and the National Research Council of Canada that was in effect on or before the date the research leading to this application was made.

BACKGROUND

Disclosed herein are processes for phase-selective gelation using alkylated aromatic acid compounds.

The topic of phase-selective gelation has attracted recent interested because of potential applications in environmental remediation, such as containment of oil spills, phase-selective isolation of toxic organic liquids from complex mixtures, or the like. The design of phase selective gelators is often a challenge because of the strong ability of water to participate in hydrogen-bonding, which can interfere with the gelation process.

Polymeric gels have also been employed as oil-water separators. Polymeric gels, however, can require high gelator loading and are not generally thermo-reversible, and recovery of the oil phase from the gelator or vice versa is difficult, if not impossible. For this reason of recyclability of the gelator agent, a low molecular weight compound is preferable.

An organogel is a three-dimensional network of non-covalently interacting molecules with interstitial spaces filled by organic liquid. Low molecular weight organogels are a rapidly developing class of such materials, in which small molecular building blocks self-assemble into hydrogen-bonded assemblies that can form a three-dimensional network capable of rigidifying entire fluids at very low concentrations. The use of organogel materials is diverse and spans many applications such as medicine, electronics, printing, personal care, and environmental remediation.

The "bottom up" self-assembly of molecular building blocks into nanostructured materials has attracted significant interest for advanced materials research. Nanostructured materials with controlled size, shape, and function are important for numerous industrial applications. Low molecular weight organogels are a rapidly developing class of such materials, in which small molecular building blocks self-assemble into hydrogen-bonded assemblies that can form a three-dimensional network capable of rigidifying entire fluids at very low concentrations. The use of organogel materials is diverse and spans many applications such as medicine, electronics, printing, personal care, and environmental remediation. Although a large number of organogelator compounds have been reported by many researchers, the rational design and synthesis of new organogelators remains a significant challenge since the gel properties in a given liquid cannot be predicted from the molecular structures alone. In addition, not all self-assembling nanostructures form gels when placed in contact with a liquid.

While known compositions and processes are suitable for their intended purposes, a need remains for materials and processes for separating oil-water mixtures. In addition, a need remains for materials and processes for containing, separating, and recovering a desired or undesired phase from a mixture of two immiscible liquid phases, such as an oil spill in water. Further, a need remains for such materials and processes wherein the materials used for the phase separation can be recycled. Additionally, a need remains for such materials and processes wherein the materials have self-complementary functional groups that can self-assemble readily by a "bottom-up" fabrication strategy to produce well-defined nanostructures and potentially higher-order network structures; bottom-up fabrication strategies entail growing structures of the desired shape and dimensions from smaller building blocks, also referred to as self-assembly. A need also remains for such materials and processes wherein in some embodiments the separation process, i.e., gelation, may be triggered by external stimuli, such as heat, light, ultrasound, chemical stimuli, mechanical stimuli, or the like. In addition, a need remains for such materials and processes wherein in some embodiments the recovery process is reversible, which facilitates recovery of the oil, the water, and the gelator.

SUMMARY

Disclosed herein is a process which comprises mixing an alkylated aromatic acid with a mixture comprising a first liquid and a second liquid, thereby causing formation of an organogel comprising the alkylated aromatic acid and the first liquid. Also disclosed herein is a method for extracting a first liquid from a second liquid which comprises: (a) providing a mixture comprising a first liquid and a second liquid; and (b) contacting the mixture with an alkylated aromatic acid under conditions effective to cause formation of an organogel comprising the alkylated aromatic acid and the first liquid, thereby extracting at least some of the first liquid from the second liquid. Further disclosed herein is a process for treating an organic contamination which comprises applying an alkylated aromatic acid to the oil of said oil contamination.

DETAILED DESCRIPTION

The alkylated aromatic acid compounds disclosed herein form gels by dissolution in an organic liquid with heating, and then cooling the resulting solution to result in gel formation. This process is attributable to the hierarchical self-assembly of the alkylated aromatic acid molecules into a porous nanoscale gel network, which can entrap solvent molecules and rigidify the entire volume of liquid.

The process disclosed herein entails mixing an alkylated aromatic acid with a mixture of two liquids, which in one embodiment are immiscible, thereby causing formation of a gel, and in one embodiment separation of at least some of one liquid from the other. The mixture contains at least two liquids, and may contain more than two, such as mixtures of two or more mutually miscible materials in one or both of a two-phase mixture, mixtures containing three or more immiscible phases, or the like.

The alkylated aromatic acids include those of the general formulae

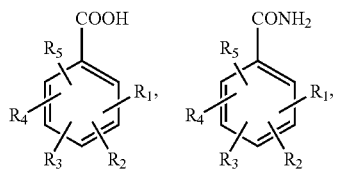

or mixtures thereof, wherein $R_1$, $R_2$, $R_3$, $R_4$, and $R_5$ each, independently of the other, are:

(a) hydrogen atoms;

(b) alkyl groups, including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 1 carbon atom, in another embodiment with at least about 6 carbon atoms, and in yet another embodiment with at least about 12 carbon atoms, and in one embodiment with no more than about 100 carbon atoms, in another embodiment with no more than about 50 carbon atoms, and in yet another embodiment with no more than about 36 carbon atoms, although the number of carbon atoms can be outside of these ranges;

(c) aryl groups, including substituted and unsubstituted aryl groups, wherein hetero atoms, such as oxygen, nitrogen, sulfur, silicon, phosphorus, boron, or the like either may or may not be present in the aryl group, in one embodiment with at least about 5 carbon atoms, in another embodiment with at least about 6 carbon atoms, and in yet another embodiment with at least about 12 carbon atoms, and in one embodiment with no more than about 100 carbon atoms, in another embodiment with no more than about 50 carbon atoms, and in yet another embodiment with no more than about 36 carbon atoms, although the number of carbon atoms can be outside of these ranges, such as phenyl or the like;

(d) arylalkyl groups, including substituted and unsubstituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the arylalkyl group, in one embodiment with at least about 6 carbon atoms, in another embodiment with at least about 7 carbon atoms, and in yet another embodiment with at least about 12 carbon atoms, and in one embodiment with no more than about 100 carbon atoms, in another embodiment with no more than about 50 carbon atoms, and in yet another embodiment with no more than about 32 carbon atoms, although the number of carbon atoms can be outside of these ranges, such as benzyl or the like; or (e) alkylaryl groups, including substituted and unsubstituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, boron, or the like either may or may not be present in either or both of the alkyl portion and the aryl portion of the alkylaryl group, in one embodiment with at least about 6 carbon atoms, in another embodiment with at least about 7 carbon atoms, and in yet another embodiment with at least about 12 carbon atoms, and in one embodiment with no more than about 100 carbon atoms, in another embodiment with no more than about 50 carbon atoms, and in yet another embodiment with no more than about 32 carbon atoms, although the number of carbon atoms can be outside of these ranges, such as benzyl or the like;

provided that at least one of $R_1$, $R_2$, $R_3$, $R_4$, and $R_5$ is —X—$R_c$, wherein:

(f) —X— is a linking group between $R_c$ and the aromatic group, with examples including (but not being limited to):
(i) —O—;
(ii) —S—;
(iii) —SO—;
(iv) —$SO_2$—;
(v) —NH—(C=O) —;
(vi) —(C=O)—NH—;
(vii) —NH—(C=S)—;
(viii) —(C=S)—NH—;
(ix) —NH—;
(x) —NH—(C=O)—NH—;
(xi) —NH—(C=S)—NH—;
(xii) —NH—(C=O)—O—;
(xiii) —NH—(C=O)—S—;
(xiv) —O—(C=O)—NH—;
(xv) —S—(C=O)—NH—;
(xvi) —NH—(C=S)—O—;
(xvii) —NH—(C=S)—S—;
(xviii) —O—(C=S)—NH—;
(xix) —S—(C=S)—NH—;
(xx) —(C=O)—O—;
(xxi) —(C=O)—S—;
(xxii) —O—(C=O) —;
(xxiii) —S—(C=O) —;
(xxiv) —(C=S)—O—;
(xxv) —(C=S)—S—;
(xxvi) —O—(C=S)—;
(xxvii) —S—(C=S)—;
(xxviii) —O—(C=O)—O—;
(xxix) —O—(C=S)—O—;
or the like, as well as combinations thereof; and $R_c$ is an alkyl group, including linear, branched, saturated, unsaturated, cyclic, substituted, and unsubstituted alkyl groups, and wherein hetero atoms, such as oxygen, nitrogen, sulfur, silicon, phosphorus, boron, or the like either may or may not be present in the alkyl group, in one embodiment with at least about 6 carbon atoms, in another embodiment with at least about 12 carbon atoms, and in yet another embodiment with at least about 18 carbon atoms, and in one embodiment with no more than about 100 carbon atoms, in another embodiment with no more than about 50 carbon atoms, and in yet another embodiment with no more than about 32 carbon atoms, although the number of carbon atoms can be outside of these ranges;

wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring.

In one specific embodiment, exactly one of $R_1$, $R_2$, $R_3$, $R_4$, and $R_5$ is —X—$R_c$. In another specific embodiment, exactly two of $R_1$, $R_2$, $R_3$, $R_4$, and $R_5$ are each, independently of the other, an —X—$R_c$ group. In another specific embodiment, exactly one of $R_1$, $R_2$, $R_3$, $R_4$, and $R_5$ is —X—$R_c$ and exactly one of $R_1$, $R_2$, $R_3$, $R_4$, and $R_5$ is —COOH or —CONH$_2$.

In one specific embodiment, the compound is of the formulae

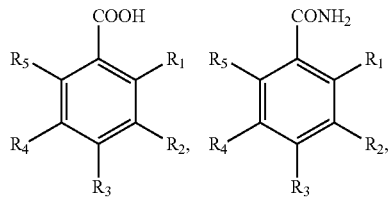

or mixtures thereof, wherein $R_1$, $R_3$, and $R_5$ are each hydrogen atoms. In a further specific embodiment, $R_1$, $R_3$, and $R_5$ are each hydrogen atoms, $R_2$ is —$X_1$—$R_{c1}$, and $R_4$ is —COOH, —CONH$_2$, or —$X_2$—$R_{c2}$, wherein $X_1$ and $X_2$ can be either the same as or different from each other, and $R_{c1}$ and $R_{c2}$ can be either the same as or different from each other. In a further specific embodiment, the compound is of the formula

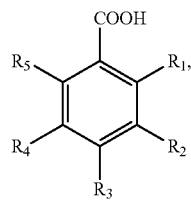

$R_1$, $R_3$, and $R_5$ are each hydrogen atoms, $R_2$ is —$X_1$—$R_{c1}$, and $R_4$ is —COOH or —$X_2$—$R_{c2}$, wherein $X_1$ and $X_2$ can be either the same as or different from each other and $R_{c1}$ and $R_{c2}$ can be either the same as or different from each other.

The above formulas encompass structures of the formula

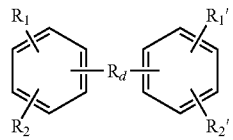

wherein $R_1'$ has the same definition as $R_1$ and can be either the same as or different from $R_1$, $R_2'$ has the same definition as $R_2$ and can be either the same as or different from $R_2$, and $R_d$ is a difunctional moiety that bridges two or more aromatic acid groups, with examples of suitable $R_d$ groups including (but not being limited to):
(a) —(CH$_2$)$_n$—;
(b) —X—(CH$_2$)$_n$—X'—;
(c) —[(XCH$_2$CH$_2$)$_n$]X'—;
(d) —[(C=O)—(CH$_2$)$_n$—(C=O)]—;
(e) —X—[(C=O)—(CH$_2$)$_n$—(C=O)]—X'—;
(f) —X—[(C=O)—K—(CH$_2$)$_n$—X"—(C=O)]—X'"—;
(g) —[(C=O)—X—(CH$_2$)$_n$—X'—(C=O)]—;

or the like, wherein X, X', X", and X'" each, independently of the other, are defined as O, S, or NH, and n is an integer, in one embodiment at least about 1, and in one embodiment no more than about 50. Specific examples of $R_d$ also include large branched alkylated functional groups such as

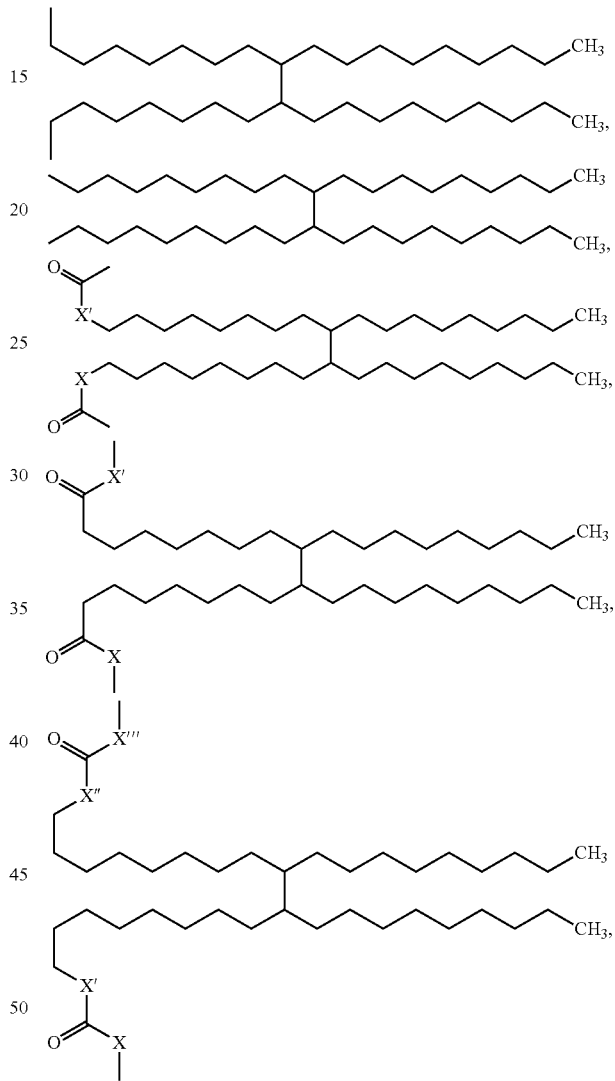

or the like, as well as mixtures thereof, wherein X, X', X", and X'" each, independently of the other, are defined as O, S, or NH.

Specific examples of $R_c$ groups include (but are not limited to):
(a) linear unsubstituted alkyl groups of the formula —(CH$_2$)$_n$CH$_3$, wherein n is in one embodiment at least about 5, in another embodiment at least about 10, and in yet another embodiment at least about 15, and in one embodiment no more than about 50, in another embodiment no more than about 40, and in yet another embodiment no more than about 25, although the value of n can be outside of these ranges, including specific values such as:

(i) 17;
(ii) 15;
(iii) 11;
or the like; and
(b) branched unsubstituted alkyl groups of the formula

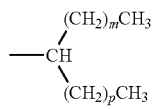

wherein m is in one embodiment 0, in another embodiment at least 1, and in yet another embodiment at least about 3, and in one embodiment no more than about 17, in another embodiment no more than about 11, and in yet another embodiment no more than about 5, although the value of m can be outside of these ranges, and wherein p is in one embodiment 0, in another embodiment at least 1, and in yet another embodiment at least about 3, and in one embodiment no more than about 17, in another embodiment no more than about 11, and in yet another embodiment no more than about 5, although the value of p can be outside of these ranges, including specific values such as:
(i) m=11, p=9;
(ii) m=5, p=3;
(iii) m=7, p=5;
(c) branched unsubstituted alkyl groups of the formula

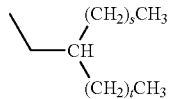

wherein s is an integer, in one embodiment 0, in another embodiment at least about 1, and in yet another embodiment at least about 3, and in one embodiment no more than about 49, in another embodiment no more than about 11, and in yet another embodiment no more than about 5, although the value of s can be outside of these ranges, and wherein t is an integer, in one embodiment 0, in another embodiment at least about 1, and in yet another embodiment at least about 3, and in one embodiment no more than about 59, in another embodiment no more than about 11, and in yet another embodiment no more than about 5, although the value of t can be outside of these ranges;
(d) branched unsubstituted alkyl groups of the formula

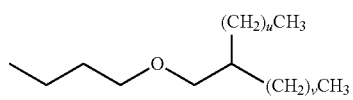

wherein u is an integer, in one embodiment 0, in another embodiment at least about 1, and in yet another embodiment at least about 3, and in one embodiment no more than about 49, in another embodiment no more than about 11, and in yet another embodiment no more than about 5, although the value of u can be outside of these ranges, and wherein v is an integer, in one embodiment 0, in another embodiment at least about 1, and in yet another embodiment at least about 3, and in one embodiment no more than about 59, in another embodiment no more than about 11, and in yet another embodiment no more than about 5, although the value of v can be outside of these ranges;
(e) multi-branched unsubstituted alkyl groups of the formula

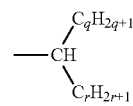

wherein q is an integer, in one embodiment at least about 1, in another embodiment at least about 4, and in yet another embodiment at least about 6, and in one embodiment no more than about 18, in another embodiment no more than about 12, and in yet another embodiment no more than about 10, although the value of q can be outside of these ranges, and wherein r is an integer, in one embodiment at least about 1, in another embodiment at least about 4, and in yet another embodiment at least about 6, and in one embodiment no more than about 18, in another embodiment no more than about 12, and in yet another embodiment no more than about 10, although the value of r can be outside of these ranges, including specific values such as:

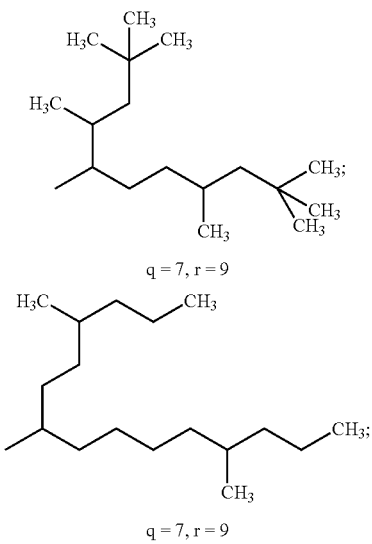

or the like, as well as mixtures thereof.

Some specific examples of suitable compounds include those of the formula

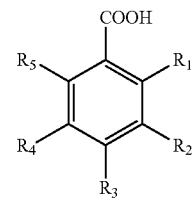

wherein $R_1$, $R_2$, and $R_3$ are each hydrogen atoms and:
(a) $R_2$ is —COOH and $R_4$ is

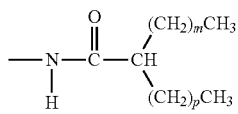

wherein m is 11 and p is 9;
(b) $R_2$ is —COOH and $R_4$ is

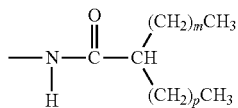

wherein m is 5 and p is 3;
(c) $R_2$ is —COOH and $R_4$ is

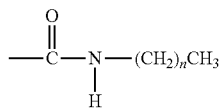

wherein n is 17;
(d) $R_2$ is —COOH and $R_4$ is

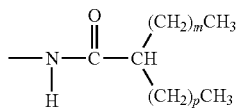

wherein m is 7 and p is 5;
(e) $R_2$ is —COOH and $R_4$ is

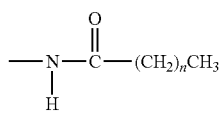

wherein n is 15;
(f) $R_2$ is —COOH and $R_4$ is

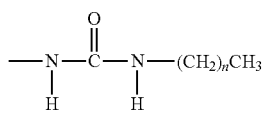

wherein n is 11;
(g) $R_2$ is —COOH and $R_4$ is

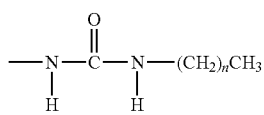

wherein n is 17;
(h) $R_2$ is

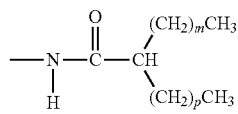

wherein m is 11 and p is 9, and $R_4$ is

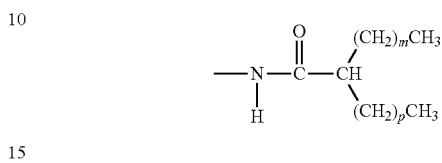

wherein m is 11 and p is 9;
(i) $R_2$ is

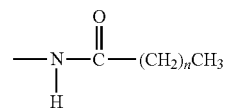

wherein n is 17 and $R_4$ is

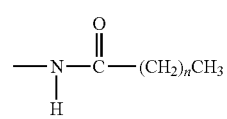

wherein n is 17; or the like.

Alkylated aromatic acid compounds can be prepared as disclosed in, for example, U.S. Pat. No. 7,905,954 and Copending U.S. application Ser. No. 12/820,497, the disclosures of each of which are totally incorporated herein by reference.

The alkylated aromatic acid compound or mixture thereof is mixed with or contacted with a mixture comprising a first liquid and a second liquid, thereby causing formation of an organogel comprising the alkylated aromatic acid and the first liquid. In some embodiments, the first and second liquids are immiscible.

Any desired or effective organic liquid can be used as the first liquid, including (but not limited to) hydrocarbons, including aliphatic and aromatic hydrocarbons, alcohols, amines, esters, ethers, mercaptans, acids (including carboxylic acids, sulfonic acids, or the like, as well as mixtures thereof), sulfones, anhydrides, acid halides, siloxanes, polymeric liquids, ionic liquids, or the like, as well as mixtures thereof.

Specific examples of suitable organic liquids include (but are not limited to):

linear, branched, and/or cyclic unsubstituted aliphatic hydrocarbons, such as butanes, pentanes, such as n-pentane, isopentane, neopentane, cyclopentane, or the like, hexanes, such as n-hexane, isohexane, neohexane, cyclohexane, or the like, heptanes, such as n-heptane, isoheptane, neoheptane, cycloheptane, or the like, octanes, such as n-octane, isooctane, neooctane, cyclooctane, or the like, nonanes, decanes, such as n-decane, isodecane, neodecane, decadehydronaphthalene, or the like, undecanes, dodecanes, such as n-dodecane, isododecane, neododecane, or the like, as well as mixtures thereof;

linear, branched, and/or cyclic substituted aliphatic hydrocarbons, such as chloromethane, bromomethane, iodomethane, dichloromethane, dibromomethane, bromochloromethane, dichlorofluoromethane, trichlorofluoromethane, chlorodifluoromethane, chloroform, bromoform, carbon tetrachloride, dichloroethanes, dibromoethanes, trichloroethanes, ethyl iodide, propyl iodides, butyl iodides, tetrachloroethanes, tetrachloroethylene, or the like, as well as mixtures thereof;

unsubstituted aromatic and heteroaromatic hydrocarbons, such as benzene, toluene, xylenes, mesitylene, styrene, pyridine, pyrrole, furan, pyrazine, or the like, as well as mixtures thereof;

substituted aromatic and heteroaromatic hydrocarbons, such as fluorobenzene, chlorobenzene, bromobenzene, iodobenzene, nitrobenzene, or the like, as well as mixtures thereof;

linear, branched, and/or cyclic unsubstituted aliphatic alcohols, such as methanol, ethanol, propanols, butanols, pentanols, hexanols, heptanols, octanols, nonanols, decanols, undecanols, dodecanols, or the like, as well as mixtures thereof;

aliphatic and aromatic amines, such as methyl amine, ethyl amine, propyl amine, butylamine, pentylamine, hexylamine, octylamine, decylamine, dodecylamine, triethyl amine, diisopropyl ethyl amine, aniline, methyl anthranilate, or the like, as well as mixtures thereof;

fatty acids, such as caprylic acid, lauric acid, myristic acid, palmitic acid, stearic acid, unsaturated fatty acids such as oleic acid and linoleic acid, fatty acid oils such as soybean oil, canola oil, olive oil, tung oil, sunflower oil, safflower oil, hemp oil, cottonseed oil, palm oil, corn oil, or the like, as well as mixtures thereof;

aliphatic and aromatic esters, such as methyl acetate, ethyl acetate, butyl acetate, amyl acetate, methyl hexanoate, methyl octanoate, methyl myristate, methyl oleate, methyl linoleate, methyl benzoate, ethyl benzoate, benzyl benzoate, or the like, as well as mixtures thereof;

aliphatic and aromatic ethers, such as diethyl ether, dipropyl ethers, dibutyl ethers, dipentyl ethers, anisole, diphenyl ether, or the like, as well as mixtures thereof;

with examples of suitable substituents including (but not being limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, acyl groups, acid anhydride groups, azide groups, azo groups, cyanato groups, isocyanato groups, thiocyanato groups, isothiocyanato groups, carboxylate groups, carboxylic acid groups, urethane groups, urea groups, silyl groups, siloxyl groups, silane groups, mixtures thereof, or the like, wherein two or more substituents can be joined together to form a ring;

or the like, as well as mixtures thereof.

The second liquid is in some embodiments immiscible with the first liquid. Examples include water and the like.

The alkylated benzimidazolone compound is mixed with the first liquid in any desired or effective amount to form an organogel, in one embodiment at least about 0.05% by weight, in another embodiment at least about 0.1% by weight, and in yet another embodiment at least about 1% by weight, and in one embodiment no more than about 20% by weight, in another embodiment no more than about 10% by weight, and in yet another embodiment no more than about 5% by weight, although the amount can be outside of these ranges.

The first liquid and second liquid can be present in any desired or effective relative amounts, in one embodiment at least about 0.1 part by weight first liquid per every 1 part by weight second liquid, in another embodiment at least about 0.2 part by weight first liquid per every 1 part by weight second liquid, and in yet another embodiment at least about 0.5 part by weight first liquid per every 1 part by weight second liquid, and in one embodiment no more than about 1 part by weight first liquid per every 1 part by weight second liquid, although the relative amounts can be outside of these ranges.

Contaminant liquids can be removed from the resulting gel for recycling by any desired or effective method, such as distillation or the like.

The phase selective gelation processes disclosed herein have a number of applications, including environmental remediation processes such as containment and/or cleanup of chemical spills, remediation of oil spills, or the like.

Specific embodiments will now be described in detail. These examples are intended to be illustrative, and the claims are not limited to the materials, conditions, or process parameters set forth in these embodiments. All parts and percentages are by weight unless otherwise indicated.

The compounds in Examples I and II were used to gel organic liquids by the vial inversion method as described in, for example, Fages, F. *Low Molecular Mass Gelators*, Vol. 256, 2005 in Topics in Current Chemistry, the disclosure of which is totally incorporated herein by reference. Gels were prepared by placing a specified amount of gelator powder in a vial with an appropriate organic solvent. The mixtures were then heated to a specified temperature for a certain period of time until a homogeneous mixture or clear solution was obtained, followed by cooling and standing at room temperature for at least 30 min. The gels were then qualitatively evaluated using the "inversion test," which entailed inverting the gel sample and observing the flow behavior. If the material did not flow or fall under its own weight under gravity, the material was classified as a gel.

EXAMPLE I

Synthesis of 5-(2'-decyltetradecanamido)isophthalic acid

Step 1: Synthesis of 2-decyltetradecanoyl chloride

2-Decyltetradecanoic acid (ISOCARB 24, obtained from Sasol America, TX, 7.65 g, 20.8 mmol) and a catalytic amount of N,N'-dimethylformamide (0.28 mL, 3.62 mmol) were dissolved in dry tetrahydrofuran (100 mL) under an inert atmosphere. The mixture was cooled to 0° C. and oxalyl chloride (7.3 mL, 83.7 mmol, obtained from Sigma-Aldrich, Milwaukee, Wis.) was added dropwise slowly and allowed to stir for at least 10 min until the evolution of hydrochloric acid gas had ceased. The mixture was allowed to warm slowly to room temperature over 3 h before the solvent was removed by rotary evaporation to afford the acid chloride compound as a viscous, pale yellow syrup, which was used in the next step without further purification.

Step 2: Synthesis of 5-(2'-decyltetradecanamido)isophthalic acid

A suspension of 2-decyltetradecanoyl chloride from Step 1 in dry tetrahydrofuran (80 mL) was added dropwise slowly to a suspension of dimethyl 5-aminoisophthalate (Aldrich, 4.40 g, 21.0 mmol), triethyl amine (4.4 mL, 31.5 mmol), and dry tetrahydrofuran (100 mL) under an inert atmosphere at 0° C. The reaction was allowed to warm slowly to room temperature and was stirred overnight. Deionized water (10 mL) was added and the tetrahydrofuran was removed by rotary evaporation. The crude residue was then dissolved in 250 mL of ethyl acetate and washed with 3 successive 100 mL portions of deionized water. The ethyl acetate was then removed from the organic phase by rotary evaporation and the product was dried in vacuo to give crude dimethyl 5-(2'-decyltetradecanamido)isophthalate (12.56 g) as a pale yellow solid.

Step 3: Saponification of Dimethyl 5-(2'-decyltetradecanamido)isophthalate

Dimethyl 5-(2'-decyltetradecanamido)isophthalate (12.56 g) from Step 2, potassium hydroxide (4.67 g, 0.0832 mol), and methanol (100 mL) were added to a 500 mL vessel and the mixture was heated and maintained at reflux overnight. The reaction was then cooled to room temperature to give a turbid red-orange mixture. The mixture was subsequently acidified with hydrochloric acid (7 mL) to give a white precipitate, which was collected by suction filtration, washed with deionized water, and then dried in vacuo to give an off-white powder (11.7 g). The product was identified by $^1$H and $^{13}$C NMR spectroscopy and ESI-MS and was of satisfactory purity. The product was believed to be of the formula

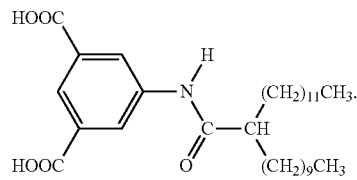

Gelation of Kerosene 5-(2'-Decyltetradecanamido)isophthalic acid was used for gelling liquid kerosene. The compound as prepared in the steps above (10.1 mg) and kerosene (1 mL) were placed in a sealed vessel and mixed and heated until a clear, homogeneous solution was obtained. After slowly cooling and allowing the vessel to stand at room temperature for at least 30 min, a transparent gel was formed, which did not fall or flow upon inverting the vessel.

Phase Selective Gelation of Kerosene from Kerosene-Water Mixtures

The compound 5-(2'-decyltetradecanamido)isophthalic acid as prepared in the above steps (10.9 mg), kerosene (1 mL), and deionized water (1 mL) were sealed in a 4 mL screw cap vial. The mixture was then heated with a heat gun with mild shaking until two clear solution phases were obtained. After allowing the mixture to cool and stand at room temperature for at least 30 min, the top kerosene phase was observed to form an opaque, solid phase, which upon inversion of the vial was stable enough to contain and support the weight the bottom, clear aqueous phase.

Phase Selective Gelation of Kerosene from Kerosene-Water Mixtures with Bath Sonication The compound 5-(2'-decyltetradecanamido)isophthalic acid as prepared in the above steps (10.4 mg) was added to the top of a mixture of kerosene (1 mL) and deionized water (1 mL) and sealed in a 4 mL screw cap vial. The mixture was then placed in an ultrasonic bath (100 W, 42 kHz, Bransonic Ultrasonic Cleaner, Branson Ultrasonics Corporation) for 5 min. Thereafter, upon standing, the top kerosene phase was observed to form an opaque, solid phase, which upon inversion of the vial was stable enough to contain and support the weight the bottom, clear aqueous phase.

Phase Selective Gelation of Kerosene from Kerosene-Water Mixtures with Vortex Mixing The compound 5-(2'-decyltetradecanamido)isophthalic acid as prepared in the above steps (9.6 mg) was added to the top of a mixture of kerosene (1 mL) and deionized water (1 mL) and sealed in a 4 mL screw cap vial. The mixture was then placed on a Fisher Scientific vortex mixer for 5 min. Upon standing for several days, the top kerosene phase was observed to form an opaque, solid phase, which upon inversion of the vial was stable enough to contain and support the weight the bottom, clear aqueous phase.

EXAMPLE II

Synthesis of 5-(2'-butyloctanamido)isophthalic acid]

Step 1: Synthesis of 2-butyloctanoyl chloride

2-Hexyldecanoic acid (ISOCARB 12, obtained from Sasol America, TX, 11.43 g, 57.1 mmol) and dry tetrahydrofuran (200 mL) were added to a 500 mL single-neck round-bottom flask under an inert atmosphere. A catalytic amount of N,N'-dimethylformamide (0.3 mL, 3.87 mmol) was then added, followed by the slow, dropwise addition of oxalyl chloride (7.0 mL, 80.2 mmol). The mixture was stirred for 10 min until evolution of hydrochloric acid gas had ceased, before slowly warming to room temperature over 2 h. Rotary evaporation of the THF afforded the acid chloride 2-butyloctanoyl chloride as a brown oil, which was dried in vacuo prior to use in Step 2.

Step 2: Synthesis of dimethyl 5-(2'-butyloctanamido)isophthalic acid

A solution of 2-butyloctanoyl chloride from Step 1 in dry tetrahydrofuran (50 mL) was slowly added dropwise to another solution of dimethyl 5-aminoisophthalate (Aldrich Chemical Co., 11.08 g, 53.0 mmol) and triethyl amine (11.0 mL, 78.9 mmol) in tetrahydrofuran (250 mL) under an inert atmosphere at 0° C. The mixture was then allowed to warm slowly to room temperature and was stirred overnight. Deionized water (10 mL) was added and the tetrahydrofuran was removed by rotary evaporation. The crude residue was then dissolved in 200 mL of diethyl ether, and was washed successively with saturated sodium bicarbonate (60 mL), deionized water (60 mL), and brine (60 mL). The organic phase was then dried over sodium sulfate and filtered before removing the diethyl ether by rotary evaporation. Crude dimethyl 5-(2-butyloctanamido)isophthalic acid (21.71 g) was obtained as an amber oil after drying in vacuo.

Step 3: Saponification of dimethyl
5-(2'-butyloctanamido)isophthalate

Dimethyl 5-(2'-butyloctanamido)isophthalate from Step 2, potassium hydroxide (85%, 29.61 g, 0.0527 mol), and methanol (200 mL) were heated and maintained at reflux overnight. The reaction was then cooled to room temperature to give a turbid red-orange mixture. The mixture was then acidified with hydrochloric acid to give a white precipitate, which was collected by suction filtration, washed with deionized water, and then dried in vacuo to give a white powder (18.94 g). The product was identified by $^1$H and $^{13}$C NMR spectroscopy and ESI-MS and was of satisfactory purity. The product was believed to be of the formula

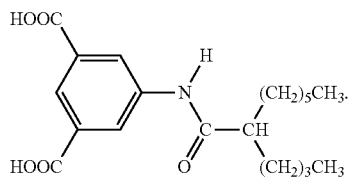

Gelation of xylenes using
5-(2'-butyloctanamido)isophthalic acid

A 0.56M ethanolic solution of 5-(2'-butyloctanamido) isophthalic acid from the above steps (50 μL, 28.0 μmol), 10.1 mg) was added to xylenes (1 mL) and gently agitated for a few seconds. Upon standing, the mixture solidified into a turbid gel, which did not fall or flow upon inverting the vessel.

Phase Selective Gelation of Xylenes from
Xylenes:Water Mixtures Using
5-(2'-butyloctanamido)isophthalic acid A 0.56M ethanolic solution of 5-(2'-butyloctanamido) isophthalic acid from the above steps (50 μL, 28.0 μmol), 10.1 mg) was added to a mixture of xylenes (1 mL) and water (1 mL) and agitated for a few seconds. Upon standing, the top xylenes layer selectively solidified into an opaque gel, which contained and supported the weight of the clear lower water layer upon inverting the vessel.

EXAMPLE III

Synthesis of
3,5-bis(T-decyltetradecanamido)benzoic acid

Step 1: Synthesis of 2-decyltetradecanoyl chloride

2-Decyltetradecanoic acid (ISOCARB 24, obtained from Sasol America, 1.15 g, 3.13 mmol) and dry tetrahydrofuran (20 mL) were mixed in a 100 mL vessel with stirring under inert atmosphere. The mixture was cooled to 0° C. for at least 30 min, after which a catalytic amount of N,N'-dimethylformamide (4 drops) was added, followed by the slow, dropwise addition of oxalyl chloride (1 mL, 12.6 mmol). The reaction was then allowed to warm slowly to room temperature and allowed to stir for 30 min prior to removing the solvent by rotary evaporation. The acid chloride compound thus obtained was used in the next step without further purification.

Step 2: Synthesis of methyl
3,5-bis(2'-decyltetradecanamido)benzoate 3,5-Diaminobenzoic acid (Sigma-Aldrich) was esterified using a known procedure (*Electrochimica Acta* 2001, 46, 3955-3962) with thionyl chloride and anhydrous methanol to give the corresponding methyl ester, methyl 3,5-diaminobenzoate. Methyl 3,5-diaminobenzoate (260.8 mg, 1.9 mmol) was dissolved in dry tetrahydrofuran (5 mL) in a 100 mL vessel under inert atmosphere. Triethylamine (0.7 mL, 4.99 mmol) was then added and the solution was cooled to 0° C. A solution of 2-decyltetradecanoyl chloride from Step 1 in dry tetrahydrofuran (10 mL) was then added slowly, dropwise. The reaction was then allowed to warm slowly to room temperature. After stirring overnight, the reaction was quenched with water and the tetrahydrofuran was removed by rotary evaporation. The crude product residue was then dissolved in diethyl ether (50 mL) and washed with deionized water (20 mL). The ether layer was separated and concentrated to give methyl 3,5-bis(2'-decyltetradecanamido)benzoate as a pale pink solid (1.17 g).

Step 3: Saponification of methyl
3,5-bis(2'-decyltetradecanamido)benzoate

Methyl 3,5-bis(2'-decyltetradecanamido)benzoate from Step 2, potassium hydroxide (0.38 g, 5.77 mmol), and methanol (20 mL) were added to a 50 mL vessel and heated to reflux. Deionized water (10 mL) was then added and the reaction was held at reflux overnight. The reaction was then cooled to room temperature, which resulted in the formation of an oil phase. Diethyl ether (20 mL) was added and the aqueous phase was removed. The organic phase was then washed successively with 1M hydrochloric acid (30 mL), 0.1M hydrochloric acid (30 mL), and deionized water twice (30 mL each), before concentrating the ether layer by rotary evaporation and drying in vacuo to give 3,5-bis(2'-decyltetradecanamido)benzoic acid as a light brown waxy solid (1.33 g, 99%). The product was identified by $^1$H and $^{13}$C NMR spectroscopy and ESI-MS and was of satisfactory purity. The product was believed to be of the formula

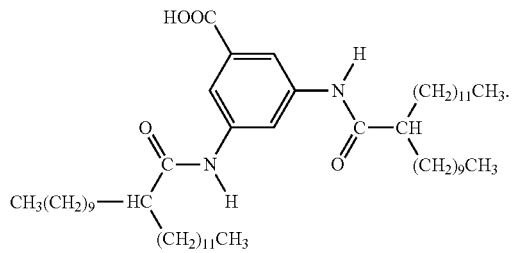

EXAMPLE IV

Synthesis of 5-(octadecylureido)isophthalate

Step 1: Synthesis of dimethyl
5-(octadecylureido)isophthalate

Dimethyl 5-aminoisophthalate (obtained from Aldrich Chemical Co., Milwaukee, Wis., 0.441 g, 2.12 mmol) was dissolved in dry N,N-dimethylformamide (8 mL) in a 50 mL round-bottom flask under inert atmosphere. A 2.12M solution of octadecylisocyanate (2.12 mmol) in dry N,N-dimethylformamide (1 mL) was then added dropwise. The residual octadecylisocyanate solution was quantitatively transferred with 2 portions of N,N-dimethylformamide (1 mL each) and the reaction was stirred overnight at room temperature. The reaction was then heated to 100° C. for 22 h, and thereafter cooled to room temperature to give a white slurry. The solid was then vacuum filtered, washed with fresh N,N-dimethylformamide, and then washed with deionized water. The filtrate was concentrated by rotary evaporation to give a white solid.

Step 2: Saponification of dimethyl 5-(octadecylureido)isophthalate

Crude dimethyl 5-(octadecylureido)isophthalate from Step 1 (330 mg, 0.654 mmol) was suspended in methanol (15 mL). Potassium hydroxide (0.1983 mg, 3.53 mmol) was then added and the mixture was heated to reflux for 2 h. After cooling to room temperature, the suspended white solid was recovered by filtration and washed with cold methanol. The crude solid was then suspended in 1M hydrochloric acid and stirred for 2 days, after which the product was collected by filtration, washed with deionized water, and dried in vacuo to yield a white powder (124.8 mg). The product was identified by $^1$H and $^{13}$C NMR spectroscopy and ESI-MS and was of satisfactory purity. The product was believed to be of the formula

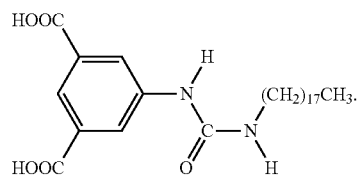

EXAMPLE V

Synthesis of 9,10-dinonyloctadecanamidodiisophthalic acid

Step 1: Synthesis of 9,10-dinonyloctadecanedioic acid tetrachloride

PRIPOL® 1006 (96%, 3.23 g, 5.70 mmol, obtained from Uniqema) and dry tetrahydrofuran (50 mL) were added to a 250 mL round-bottom flask under inert atmosphere. The solution was then cooled to 0° C. for at least 30 min before a catalytic amount of N,N'-dimethylformamide (0.10 mL, 1.3 mmol) was added, followed by the slow, dropwise addition of oxalyl chloride (2.0 mL, 23.3 mmol). The mixture was then slowly allowed to warm to room temperature and stirred for 3.5 h before the solvent was removed by rotary evaporation to afford a colorless liquid with suspended white solid. The tetraacid chloride compound thus obtained was used in the next step without further purification.

Step 2: Synthesis of tetramethyl 9,10-dinonyloctadecanamidodiisophthalic acid 9,10-Dinonyloctadecanedioic acid tetrachloride from Step 1 and dry tetrahydrofuran (50 mL) were mixed under inert atmosphere and the mixture was cooled to 0° C. for at least 30 min. Dimethyl 5-aminoisophthalate (Aldrich, 2.65 g, 12.7 mmol) was then added as a solution in dry N,N'-dimethylformamide (15 mL) slowly, dropwise to the flask containing the tetraacid chloride. Two successive rinses with tetrahydrofuran (10 mL) were done to quantitatively transfer all of the amine to the acid chloride flask. Triethylamine (2.6 mL, 18.7 mmol) was then added and the reaction was thereafter allowed to warm slowly to room temperature and stir overnight. After removing the tetrahydrofuran by rotary evaporation, the crude residue was dissolved in 140 mL diethyl ether and washed with deionized water (40 mL), saturated sodium bicarbonate (40 mL), 5% citric acid (40 mL), and brine (40 mL). The diethyl ether layer was then dried over sodium sulfate and filtered through glass wool, after which the solvent was removed by rotary evaporation and the product was dried in vacuo to give crude tetramethyl bis isophthalate (5.61 g) as a viscous, yellow syrup. The diester thus obtained was used in the next step without further purification.

Step 3: Saponification of tetramethyl 9,10-dinonyloctadecanamido-diisophthalate

Tetramethyl 9,10-dinonyloctadecanamido-diisophthalate from Step 2, potassium hydroxide (15.38 g, 233 mmol), methanol (200 mL), and deionized water (100 mL) were added to a 500 mL vessel and the mixture was heated to reflux for 1 h. The reaction was then cooled to room temperature and acidified with 5M hydrochloric acid (50 mL) to give a white precipitate, which was collected by suction filtration, washed with deionized water, and then dried in vacuo to give a pale orange-yellow powder (4.62 g, 91%). The product was identified by $^1$H and $^{13}$C NMR spectroscopy and ESI-MS and was of satisfactory purity. The product, tetramethyl 9,10-dinonyloctadecanamidodiisophthalic acid, was believed to be of the formula

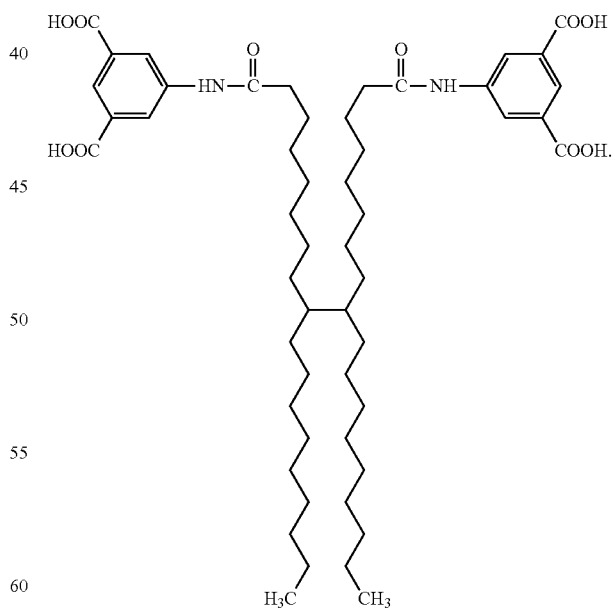

Other embodiments and modifications of the present invention may occur to those of ordinary skill in the art subsequent to a review of the information presented herein; these embodiments and modifications, as well as equivalents thereof, are also included within the scope of this invention.

The recited order of processing elements or sequences, or the use of numbers, letters, or other designations therefor, is not intended to limit a claimed process to any order except as specified in the claim itself.

What is claimed is:

1. A process which comprises mixing a single gelator compound that is an alkylated aromatic acid comprising at least one —COOH group, wherein the alkylated aromatic acid is selected from the group consisting of

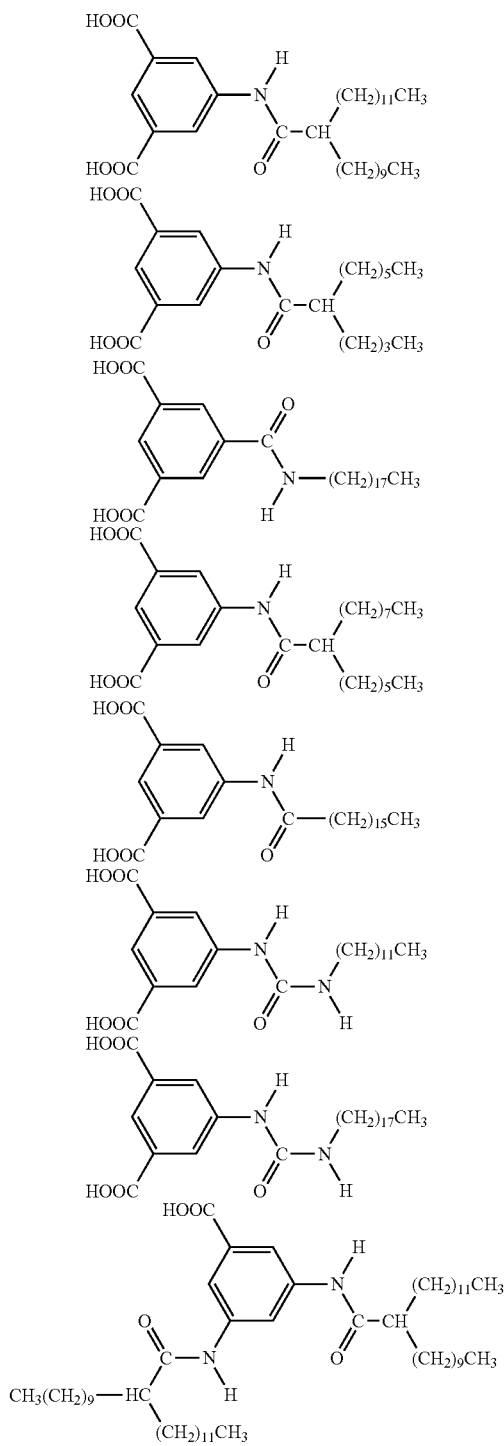

and mixtures thereof,
with a mixture comprising a first liquid and a second liquid, thereby causing formation of an organogel comprising the alkylated aromatic acid and the first liquid, wherein the first liquid and the second liquid are immiscible.

2. A process according to claim 1 wherein the alkylated aromatic acid is mixed with the first liquid in an amount of at least about 0.05% by weight of the first liquid.

3. A process according to claim 1 wherein the alkylated aromatic acid is mixed with the first liquid in an amount of no more than about 20% by weight of the first liquid.

4. A process according to claim 1 wherein the first liquid and the second liquid are present in relative amounts of from about 0.1 to about 1 part by weight first liquid per every 1 part by weight second liquid.

5. A process according to claim 1 further comprising separating the organogel from the mixture.

6. A process according to claim 5 wherein the separation process comprises distillation.

7. A method for extracting a first liquid from a second liquid which comprises:
   (a) providing a mixture comprising a first liquid and a second liquid, wherein the first liquid and the second liquid are immiscible; and
   (b) contacting the mixture with a single gelator compound that is an alkylated aromatic acid comprising at least one —COOH group, wherein the alkylated aromatic acid is selected from the group consisting of

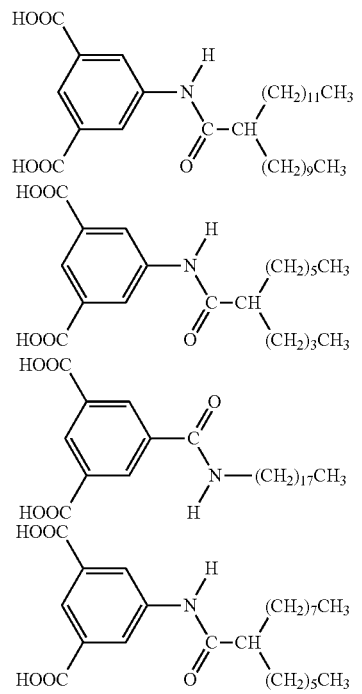

-continued

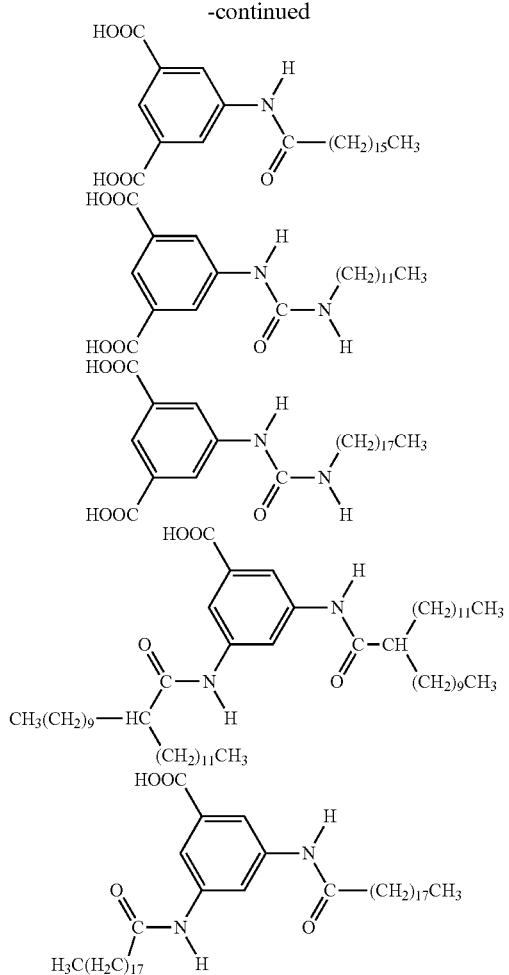

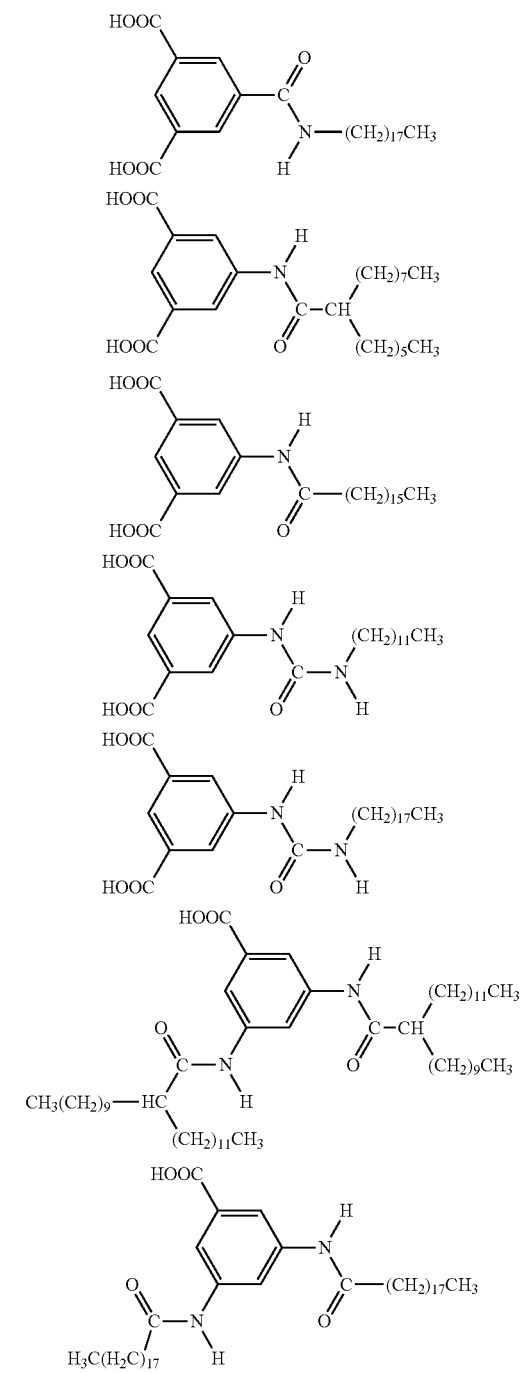

and mixtures thereof, under conditions effective to cause formation of an organogel comprising the alkylated aromatic acid and the first liquid, thereby extracting at least some of the first liquid from the second liquid.

8. A process for treating an organic contamination which comprises applying a single gelator that is an alkylated aromatic acid comprising at least one —COOH group to said contamination, wherein the alkylated aromatic acid is selected from the group consisting of

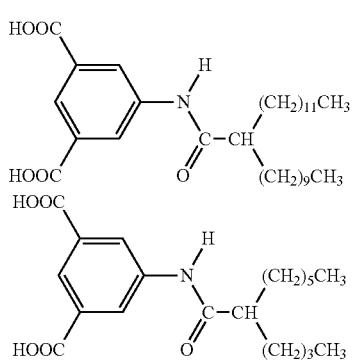

and mixtures thereof.

9. A process according to claim 8 further comprising:
(a) mixing the alkylated aromatic acid with the contamination to form an organogel; and
(b) collecting the resulting organogel.

* * * * *